(12) United States Patent
Sud et al.

(10) Patent No.: US 11,121,575 B2
(45) Date of Patent: Sep. 14, 2021

(54) METHODS AND APPARATUS TO PROVIDE POWER TO DEVICES

(71) Applicant: Intel Corporation, Santa Clara, CA (US)

(72) Inventors: Shivani A. Sud, Santa Clara, CA (US); Robin Knauerhase, Portland, OR (US); Dzung D. Tran, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 415 days.

(21) Appl. No.: 15/720,867

(22) Filed: Sep. 29, 2017

(65) Prior Publication Data

US 2018/0198309 A1    Jul. 12, 2018

Related U.S. Application Data

(63) Continuation of application No. 14/129,678, filed as application No. PCT/US2013/045861 on Jun. 14, 2013, now Pat. No. 9,859,743.

(51) Int. Cl.
*H02J 7/02* (2016.01)
*H02J 50/40* (2016.01)
(Continued)

(52) U.S. Cl.
CPC .......... *H02J 7/025* (2013.01); *G06Q 30/0237* (2013.01); *G06Q 30/0241* (2013.01);
(Continued)

(58) Field of Classification Search
CPC . Y02E 60/12; H02J 7/025; H02J 5/005; H02J 17/00; H02J 50/80; H01F 38/14;
(Continued)

(56) References Cited

U.S. PATENT DOCUMENTS

| 6,323,775 | B1 | 11/2001 | Hansson |
| 6,806,898 | B1 * | 10/2004 | Toyama ................. G06T 5/006 |
| | | | 348/14.01 |

(Continued)

FOREIGN PATENT DOCUMENTS

| CN | 102668317 | 9/2012 |
| JP | 2006121826 | 5/2006 |

(Continued)

OTHER PUBLICATIONS

European Patent Office, "Summons to attend oral proceedings pursuant to Rule 115(1) EPC," issued in connection with European Patent application No. 13886742.9, Apr. 17, 2019, 10 pages.

(Continued)

*Primary Examiner* — Nathaniel R Pelton
*Assistant Examiner* — Mohammed J Sharief
(74) *Attorney, Agent, or Firm* — Hanley, Flight & Zimmerman, LLC

(57) ABSTRACT

Methods, apparatus, systems and articles of manufacture to provide power to devices are disclosed. An example apparatus includes a display and an instruction presenter. The presenter is to generate a notification on the display. The notification indicates that delivery of power to the user device will be enabled in exchange for paying attention to the display during a media presentation. The apparatus also includes a detector to determine that a person associated with the user device is paying attention to the display. The charging station is to transmit power to the user device in response to the detector determining that the person is paying attention to the display.

24 Claims, 4 Drawing Sheets

(51) Int. Cl.
  *H02J 50/30* (2016.01)
  *H02J 50/12* (2016.01)
  *G06Q 30/02* (2012.01)
  *H04B 5/00* (2006.01)
  *H02J 5/00* (2016.01)

(52) U.S. Cl.
  CPC .......... *G06Q 30/0267* (2013.01); *H02J 5/005* (2013.01); *H02J 50/12* (2016.02); *H02J 50/30* (2016.02); *H02J 50/40* (2016.02); *H04B 5/0037* (2013.01)

(58) Field of Classification Search
  CPC .. Y02T 90/122; B60L 11/182; G06Q 30/0272
  USPC ........................ 320/108; 307/104; 705/14.68
  See application file for complete search history.

(56) References Cited

U.S. PATENT DOCUMENTS

| | | | |
|---|---|---|---|
| 9,859,743 | B2 | 1/2018 | Sud et al. |
| 2004/0001002 | A1 | 1/2004 | Blum et al. |
| 2004/0066169 | A1 | 4/2004 | Bruning |
| 2006/0192775 | A1* | 8/2006 | Nicholson ............ G06F 1/3203 345/211 |
| 2007/0073585 | A1* | 3/2007 | Apple .................... G06Q 40/00 705/14.46 |
| 2010/0079508 | A1 | 4/2010 | Hodge et al. |
| 2010/0191156 | A1* | 7/2010 | Sakamoto ............. A61B 5/165 600/595 |
| 2010/0228632 | A1 | 9/2010 | Rodriguez |
| 2010/0259213 | A1* | 10/2010 | Maharaj .................. G09F 23/02 320/107 |
| 2010/0320362 | A1 | 12/2010 | Alpert et al. |
| 2011/0043163 | A1 | 2/2011 | Baarman |
| 2011/0043327 | A1 | 2/2011 | Baarman et al. |
| 2011/0057891 | A1 | 3/2011 | Ham et al. |
| 2011/0119135 | A1 | 5/2011 | Grilli et al. |
| 2012/0028688 | A1 | 2/2012 | Vartanian |
| 2012/0075101 | A1 | 3/2012 | Austin et al. |
| 2012/0158519 | A1* | 6/2012 | Edwards ............ G06Q 30/0272 705/14.68 |
| 2012/0242285 | A1 | 9/2012 | Jung et al. |
| 2012/0288139 | A1* | 11/2012 | Singhar ................ G06F 1/3265 382/103 |
| 2013/0135198 | A1 | 5/2013 | Hodge et al. |
| 2014/0095314 | A1* | 4/2014 | Nahounou ......... G06Q 30/0272 705/14.58 |
| 2014/0298257 | A1* | 10/2014 | Grandhi ................ G06F 3/0484 715/808 |
| 2014/0363000 | A1* | 12/2014 | Bowden ........... H04N 21/44222 381/56 |
| 2015/0033880 | A1* | 2/2015 | Furukawa ............... H02J 7/025 73/866.3 |

FOREIGN PATENT DOCUMENTS

| | | | |
|---|---|---|---|
| KR | 1020120132773 | 12/2012 | |
| WO | 2009083990 | 7/2009 | |
| WO | WO-2014174523 A1 * | 10/2014 | ............. G06Q 30/02 |

OTHER PUBLICATIONS

Edmonds, "Nokia explains how wireless charging works in Lumia Windows Phones", Oct. 1, 2012, 2 pages.
Hui Sy, "Planar Wireless Charging Technology for Portable Electronic Products and Qi," proceedings of the IEEE, New York, US, vol. 101, No. 6, Jun. 1, 2013, Abstract only, 2 pages.
European Patent Office, "Communication pursuant to Article 94(3) EPC," issued in connection with European patent application No. 13886742.9, dated May 24, 2018, 6 pages.
European Patent Office, "Extended European Search Report," issued in connection with European Patent Application No. 13886742.9, dated Jan. 24, 2017 (4 pages).
Intellectual Property Office Ministry of Economic Affairs, "Notice of Allowance," issued in connection with Taiwanese Patent Application No. 103120525, dated Aug. 28, 2017, (3 pages).
Korean Intellectual Property Office, "Notice of Preliminary Rejection," issued in connection with Korean Patent Application No. 10-2015-7029394, dated Feb. 27, 2017, (4 pages).
Patent Cooperation Treaty, "International Search Report," issued in connection with Application No. PCT/US2013/045861, dated Mar. 31, 2014 (5 pages).
Patent Cooperation Treaty, "Written Opinion of the International Searching Authority," issued in connection with Application No. PCT/US2013/045861, dated Mar. 31, 2014 (7 pages).
PRC State Intellectual Property Office, "Notice of Granting Patent Right for Invention," issued in connection with Chinese Patent Application No. 201380076623.0, dated Oct. 26, 2017 (2 pages).
State Intellectual Property Office of the People's Republic of China, "First Office Action," issued in connection with Chinese Patent Application No. 201380076623.0, dated Mar. 28, 2017, (24 pages).
Taiwan Intellectual Property Office, "Search Report," issued in connection with Taiwan (R.O.C.) Patent Application No. 103120525, dated Jun. 12, 2015 (2 pages).
Taiwan Patent Office, "Office Action," issued in connection with Taiwan Patent Application No. 103120525, dated Jan. 21, 2016 (8 pages).
United States Patent and Trademark Office, "Non-Final Office action." issued in connection with U.S. Appl. No. 14/129,678, dated Oct. 5, 2015, 48 pages.
United States Patent and Trademark Office, "Notice of Allowance," issued in connection with U.S. Appl. No. 14/129,678, dated Jul. 18, 2017, 40 pages.
United States Patent and Trademark Office, "Final office action," issued in connection with U.S. Appl. No. 14/129,678, dated Mar. 24, 2017, 30 pages.
United States Patent and Trademark Office, "Final office action," issued in connection with U.S. Appl. No. 14/129,678, dated Apr. 28, 2016, 48 pages.
with U.S. Appl. No. 14/128,678, dated Apr. 28, 2016, 48 pages.

* cited by examiner

METHODS AND APPARATUS TO PROVIDE POWER TO DEVICES

CROSS REFERENCE TO RELATED APPLICATIONS

This patent arises from continuation of U.S. patent application Ser. No. 14/129,678, filed Dec. 27, 2013, now U.S. Pat. No. 9,859,743, which is a national stage of International Patent Application Serial No. PCT/US13/45861, filed Jun. 14, 2013. U.S. patent application Ser. No. 14/129,678 and International Patent Application Serial No. PCT/US13/45861 are hereby incorporated by reference herein. Priority to U.S. patent application Ser. No. 14/129,678 and International Patent Application Serial No. PCT/US13/45861 is claimed.

FIELD OF THE DISCLOSURE

This disclosure relates generally to power delivery and, more particularly, to methods and apparatus to provide power to devices.

BACKGROUND

Technological advancements in the field of wireless communication have enabled complex computing devices to become mobile. The use of laptop computers, smart phones and tablets, for example, has increased as the communication capability of such devices have improved. The only aspect preventing some mobile computing device from being completely wireless is the power cord used to charge the batteries of the mobile computing device. However, developments in wireless power delivery have provided the ability to charge batteries without having to physically couple (e.g., via a wire or port) the mobile computing devices to a charging source (e.g., an outlet, another computing device, an external battery pack, etc.).

DETAILED DESCRIPTION

Figure 1:
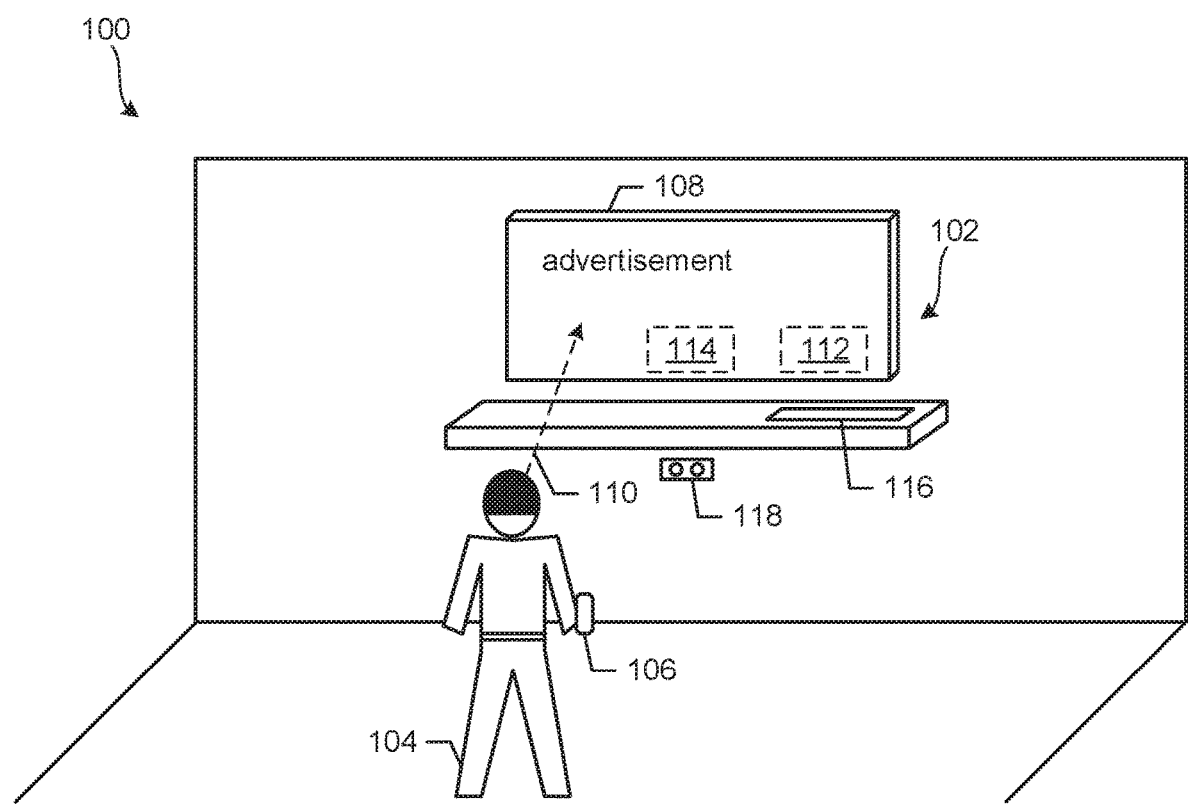
FIG. 1 illustrates an example environment including an example wireless charging station constructed in accordance with teachings of this disclosure.

People that carry mobile computing devices (e.g., smart phones, tablets, laptops, and/or any other computing device) are often without a corresponding power cord and, thus, are unable to plug the computing device into a current source to charge power sources of the computing devices, such as batteries. However, the need to charge such devices may arise unexpectedly. For example, a person in a public place and without a power cord may have forgotten to charge a computing device during the previous night or may have used an unexpectedly large amount of power throughout a day. In such instances, the person needs to charge the computing device but is unable to do so without assistance from a third party.

Examples disclosed herein provide an ability to charge a computing device when, for example, a corresponding person is otherwise unable to charge the computing device. In particular, examples disclosed herein provide charging stations located in, for example, public places such as shopping malls, airports, coffee shops, etc. Examples disclosed herein enable providers of the charging stations with an ability to monetize the provided charging services. As described in detail below, examples disclosed herein deliver power to a computing device of a person in exchange for the person paying attention to a display associated with the charging station. In some examples, the display includes one or more advertisements, promotions, offers, and/or any other suitable type of information. Using examples disclosed herein, the charging station informs people in a near vicinity that their computing device(s) will be charged if the person pays attention to (e.g., looks at and/or interacts with) the display. Examples disclosed herein repeatedly (e.g., every second, every two seconds, randomly, etc.) determine if the person is paying attention to (e.g., looking at, in front of, orientated towards, etc.) and deliver power to the corresponding computing device according to the attention determination. That is, examples disclosed herein deliver power to the computing device while the person is paying attention to the display and cease delivery of power to the computing device when the person stops paying attention to the display. In some examples disclosed herein, power is delivered to the computing device via a wireless power delivery mechanism, such as optically (e.g., via a laser) or coupled via a resonant transformer. Additionally or alternatively, examples disclosed herein deliver power to the computing device via a wired connection.

Thus, examples disclosed herein provide charging services to computing devices as motivation, consideration, and/or compensation for paying attention to, for example, an advertisement. Accordingly, examples disclosed herein enable providers of the charging stations to monetize the provision of power by, for example, entering into agreements with advertisers that reflect an increased likelihood of people paying attention to the display of the charging station.

FIG. 1 illustrates an example environment 100 including a charging station 102 constructed in accordance with teachings of this disclosure. The example charging station 102 of FIG. 1 is implemented in a public place in which people are expected to be present such as, for example, a transportation terminal (e.g., an airport, a train station, a bus terminal, etc.), a park, a sports arena, a shopping mall, a coffee shop, a hotel lobby, etc. In the example of FIG. 1, the environment 100 includes a person 104 having a computing device 106. In the illustrated example of FIG. 1, the computing device 106 is a smart phone having a chargeable power source, such as a battery. However, the example charging station 102 can be used in connection with any suitable type of chargeable computing device.

The example charging station 102 of FIG. 1 includes a media presentation device 108 to present images, audio and/or video in the environment 100. In the illustrated example of FIG. 1, the media presentation device 108 is an electronic display that cycles through a plurality of advertisements according to a schedule. In some examples, the schedule is configured according to an agreement between a provider of the example charging station 102 and one or more advertisers that provide the content to be presented via the media presentation device 108. While described herein as presenting advertisements, the example media presentation device 108 can present any suitable type of media.

In the example of FIG. 1, the person 104 is located in front of the media presentation device 108 and is looking in a direction of the media presentation device 108. That is, the person 104 is standing at a location from which the media presentation device 108 can be viewed and has a current line-of-sight 110 directed to (e.g., aligned with) the media presentation device 108. As described below in connection with FIG. 2, the person 104 being located in front of the media presentation device 108 and having the line-of-sight 110 aligned with the media presentation device 108 is indicative of the person 104 paying attention to the media presentation device 108. However, the person 104 may change his or her location and/or line-of-sight 110, thereby indicating that the person 104 is not paying attention.

The example charging station 102 of FIG. 1 includes an example device charger 112 that, in part, facilitates delivery of power to chargeable computing devices, such as the example computing device 106 of the person 104. In the illustrated example of FIG. 1, the device charger 112 is embedded in the media presentation device 108. However, the example device charger 112 of FIG. 1 may be implemented as a standalone device in communication with the media presentation device 108. As described in detail below, the example device charger 112 of FIG. 1 provides power delivery services in exchange for the person 104 paying attention to the media presentation device 108. In particular, the device charger 112 determines whether the person 104 is paying attention to the media presentation device 108 (e.g., via one or more detectors capable of measuring an amount of attention being paid to a display by a person) and, if so, delivers power and/or data to the computing device 106, thereby charging the battery of the computing device 106. In the illustrated example of FIG. 1, if the person 104 ceases paying attention to the media presentation device 108, the example device charger 112 terminates delivery of power to the computing device 106. Thus, in the illustrated example of FIG. 1, the device charger 112 charges batteries of the computing device 106 in exchange for exposure to the media being presented via the media presentation device 108. As shown in FIG. 1, the person 104 is paying attention to the media presentation device 108 and, thus, is eligible to have the corresponding computing device 106 receive power from the example device charger 112 of FIG. 1. However, if the person 104 stops paying attention (e.g., according to a threshold level of attention, according to a threshold likelihood of attention, and/or for a threshold amount of time) to the media presentation device 108, the person 104 is not eligible to have the computing device 106 receive power from the example device charger 112 of FIG. 1.

The example charging station 102 of FIG. 1 includes a plurality of charging mechanisms or power sources capable of delivering power to the computing device 106. The example charging station 102 of FIG. 1 includes a light-based wireless power source 114 embedded in the media presentation device 108. The example light-based wireless power source 114 generates a directed beam of light (e.g., a laser) that transfers power to, for example, a photovoltaic (e.g., mounted to and/or integrated with the computing device 106) capable of converting energy of the beam of light into electric energy that can be stored by a battery of the computing device 106. Further, the example charging station 102 of FIG. 1 includes a resonance-based wireless power source 116, such as a resonant transformer embedded into a pad. The example resonance-based wireless power source 116 of FIG. 1 generates an energy field to transfer power to, for example, a transformer (e.g., mounted to and/or integrated with the computing device 106) capable of converting the energy of the field into electric energy that can be used and/or otherwise stored by the battery of the computing device 106. The example charging station 102 of FIG. 1 includes a wired power source 118, such as an outlet or a port to which the computing device 106 may be coupled. In some examples, the charging station 102 provides a plurality of different cords or couplers to enable a connection between the computing device 106 and the wired power source 118.

Figure 2:
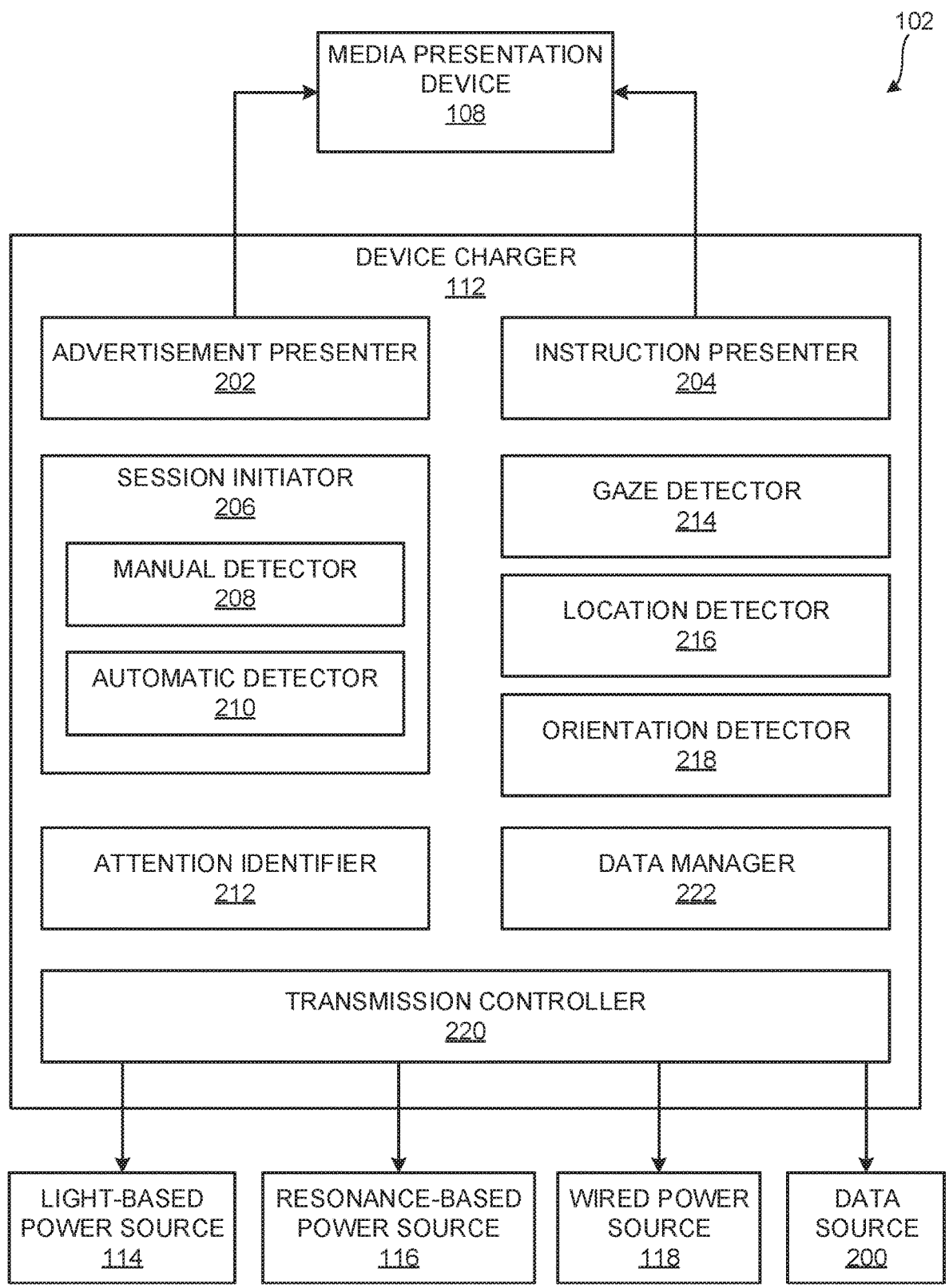
FIG. 2 is a block diagram of an example implementation of the example charging station of FIG. 1.

FIG. 2 is a block diagram representative of an example implementation of the example charging station 102 of FIG. 1. The example charging station 102 of FIG. 2 includes the device charger 112, the media presentation device 108, the light-based wireless power source 114, the resonance-based wireless power source 116, the wired power source 118, and a data source 200. The example device charger 112 of FIG. 2 detects the person 104 of FIG. 1 in a vicinity of the example charging station 102, informs (e.g., generates and/or display a notification and/or message) the person 104 that the computing device 106 may be charged by the charging station 102 if attention is paid to the media presentation device 108, determines whether the person 104 is paying attention to the media presentation device 108, and manages delivery of power to the computing device 106 according to the detected amount of attention (e.g., number of time units during which attention is paid and/or a calculated likelihood of attention being paid) being paid by the person 104.

In addition to the management of power delivery, the example device charger 112 of FIG. 2 provides media to the media presentation device 108 via an advertisement presenter 202. While described below as advertisements, the media provided to the media presentation device 108 may be any type of media (e.g., television programming, interactive video games, online content, etc.). In the illustrated example of FIG. 2, the advertisement presenter 202 receives data from one or more sources via, for example, a network communication (e.g., an Internet connection). In some examples, the advertisement presenter 202 conditions (e.g., formats and/or renders) received data such that the media presentation device 108 is capable of presenting the corresponding media. The example advertisement presenter 202 of FIG. 2 maintains a schedule and/or timer to determine when and how long each advertisement is presented via the media presentation device 108. The example advertisement presenter 202 of FIG. 2 receives configuration information regarding the schedule and/or timer in connection with the advertisement data and/or in connection with a periodic, aperiodic, scheduled or manual update.

The example device charger 112 of FIG. 2 includes an instruction presenter 204 to present (e.g., visually and/or aurally) instructions to the person 104 regarding charging of the computing device 106 via the example charging station 102 of FIG. 1. The example instruction presenter 204 of FIG. 2 conveys data representative of the charging instructions to the media presentation device 108, which displays and/or plays the charging instructions. For example, the instruction presenter 204 may convey a text file including charging instructions to be displayed on the media presentation device 108 and/or an audio file to be played on speakers of the media presentation device 108. In the illustrated example of FIG. 2, the charging instructions provided by the instruction presenter 204 inform the person 104 that the computing device 106 will receive power to charge a corresponding battery as long as the person pays attention to (e.g., looks at) the media presentation device 108.

The example instruction presenter 204 of FIG. 2 also informs the person 104 of one or more manners in which the example charging station 102 can deliver power to the computing device 106. As the example charging station 102 of FIG. 2 is capable of delivering power via a plurality of mediums, the example instruction presenter 204 provides instructions regarding each of the mediums and/or a selected medium according to an input (e.g., received from the person 104). In the illustrated example of FIG. 2, the instruction presenter 204 generates a display message to inform the person 104 that the computing device 106 can be physically coupled to the wired power source 118 via, for example, a power cord or port provided at the charging station 102 of FIG. 1. Additionally or alternatively, the example instruction presenter 204 of FIG. 2 informs the person 104, that the computing device 106 may be charged wirelessly via the light-based wireless power source 114. Light-based wireless delivery of power to the computing device 106 requires the computing device 106 to be aligned with, for example, a wireless transmitter. For example, when the light-based wireless power source 114 delivers power via a laser, the computing device 106 is required to be aligned with a light source (e.g., a laser generator and/or reflector associated with the laser generator). In such instances, the example instruction presenter 204 of FIG. 2 provides alignment directions to facilitate proper alignment of the computing device 106 with the light source. In some examples, the charging station 102 includes a receptacle (e.g., mounted to a stand) onto which the computing device 106 is to be placed to accomplish alignment with the light source. Thus, the example instruction presenter 204 of FIG. 2 indicates that the computing device 106 is to be placed on the alignment structure in a particular orientation (e.g., with a surface capable of receiving the light-based power delivery facing the charging station 102). Additionally or alternatively, the example instructions presenter 204 generates instructions for the media presentation device 108 for the person 104 regarding how to hold and/or otherwise orient the computing device 106 in a particular area that is aligned with the light source. When the resonance-based wireless power source 116 delivers power, the computing device 106 may be placed on, for example, a pad in which a resonant transformer is implemented. Thus, the example instruction presenter 204 of FIG. 2 generates instructions to be displayed on the media presentation device 108 to inform the person 104 that the computing device 106 may be positioned (e.g., laid upon) a pad or other surface associated with the resonance-based wireless power source 116 to facilitate transfer of power to the computing device 106.

In some examples, the instruction presenter 204 utilizes information associated with the computing device 106 to determine which type of power delivery is available to the computing device 106. For example, the instructions presenter 204 may utilize data communicated to the device charger 112 (e.g., as part of a handshake operation) regarding a type (e.g., model, brand, etc.) of the computing device 106 and/or capabilities (e.g., hardware, software, etc.) of the computing device 106 to determine (e.g., via a lookup table that can be updated) which power delivery mechanism(s) can be used to delivery power to the computing device 106. In such instances, the example instruction presenter 204 tailors the display messages according to the capabilities of the computing device 106.

The example charging station 102 of FIG. 2 includes a session initiator 206 to establish a session between the charging station 102 and the computing device 106. In the example of FIG. 2, the session initiator 206 includes a manual detector 208 that receives a manual input. For example, the manual detector 208 of FIG. 2 is in communication with one or more user interface elements of the charging station 102 that are selectable by the person 104 to initiate a session of advertisement exposure and device charging. For example, the person 104 of FIG. 1 may read and/or hear the offer presented via the instruction presenter 204 to have the a battery of the computing device 106 charged in exchange for attention being paid to the media presentation device 108. In response, the person 104 may select a button or other type of user interface element to initiate such an exchange. In some examples, the charging station 102 includes different user interface elements for the different charging mechanisms. For example, the charging station 102 of FIG. 2 includes a first button corresponding to the light-based wireless power source 114, a second button corresponding to the resonance-based wireless power source 116, and a third button corresponding to the wired power source 118. The example manual detector 208 detects a selection of one of the inputs and the example session initiator 206 of FIG. 2 establishes a session (e.g., by creating an instance of an application or thread having an identifier corresponding to the person 104). In the illustrated example, the session initiator 206 maintains an indicator of which of the power sources 114-118 was selected by the person 104 such that the proper one of the power sources 114-118 can be activated and deactivated.

In some examples, the session initiator 206 of FIG. 2 transmits an invitation (e.g., a beacon) to the computing device 106 to establish a session. For example, the session initiator 206 may send an invitation via Bluetooth, Near-Field Communication, WiFi, etc. such that the computing device 106 can accept the invitation to establish a session. In some examples, a response from the computing device 106 includes data regarding, for example, capabilities (e.g., hardware, software, firmware, charging capabilities, etc.) of the computing device 106.

The example session initiator 206 of FIG. 2 includes an automatic detector 210 to determine if the computing device 106 has been placed (e.g., by the person 104) in communication with the wired power source 118, the light-based wireless power source 114, or the resonance-based wireless power source 116. For example, the person 104 of FIG. 1 may plug the computing device 106 into a power cord or port coupled to the wired power source 118. In such instances, the example automatic detector 210 of FIG. 2 receives a signal from the wired power source 118 that a device is coupled to the wired power source 118. Alternatively, the person 104 may place the computing device 106 into alignment with a beam of light generated by the light-based wireless power source 114. In such instances, the example automatic detector 210 of FIG. 2 receives a signal from the light-based wireless power source 114 indicative of a device being in alignment with the light source (e.g., based on a feedback mechanism implemented by the light-based wireless power sources 114). Alternatively, the person 104 may rest the computing device 106 on the pad of the resonance-based wireless power source 116. In such instances, the example automatic detector 210 of FIG. 2 receives a signal indicative of, for example, a device being in range of the resonance-based power source 116 (e.g., resting on the pad as detected by a sensor placed in the pad). Using the signals received by the automatic detector 210, the example session initiator 206 of FIG. 2 establishes an advertisement exposure and device charging session with the computing device 106. In the illustrated example, the session initiator 206 maintains an indicator of which of the power sources 114-118 forms the basis of the automatic detection such that the proper one of the power sources 114-118 can be activated and deactivated.

When a session has been established between the computing device 106 and the example charging station 102, the example device charger 112 of FIG. 2 determines whether the person 104 is paying attention to the media presentation device 108. To do so, the example device charger 112 of FIG. 2 includes an attention identifier 212 to determine whether the person 104 is paying attention to the media presentation device 116. The example attention identifier 212 of FIG. 2 utilizes one or more of a plurality of detectors to calculate, for example, a likelihood that the person 104 is paying attention to the media presentation device 108. In some examples, the attention identifier 212 uses one or more of the detectors individually to calculate the likelihood. In some examples, the attention identifier 212 uses a combination of the detectors to calculate the likelihood.

In the example of FIG. 2, detectors used by the attention identifier 212 to calculate the likelihood of the person paying attention to the media presentation device 108 include a gaze detector 214, a location detector 216, and an orientation detector 218. The example gaze detector 214 includes image capturing equipment (e.g., a camera) to determine a direction in which the person 104 is looking. For example, the gaze detector 214 of FIG. 2 determines whether the person 104 is looking at the media presentation device 108. The example gaze detector 214 may calculate an angular value of the gaze direction of person 104 relative to, for example, a center of the media presentation device 108. In some examples, the example attention identifier 212 uses the information generated by the example gaze detector 214 to calculate the likelihood that the person 104 is paying attention to the media presentation device 108. For example, the attention identifier 212 may determine that the person 104 is not likely paying attention to the media presentation device 108 when the angular position of the gaze of the person 104 is outside and/or exceeds a threshold angular value, which indicates that the person 104 is looking away from the media presentation device 108. The example attention identifier 212 may determine that the person 104 likely paying attention to the media presentation device 108 when the angular position of the gaze of the person 104 is inside and/or is within a threshold angular value, which indicates that the person 104 is looking directly at or in the general vicinity (e.g., with a threshold angle) of the media presentation device 108. In the example of FIG. 2, the value of the likelihood of attention is proportional to directional values (e.g., angles) of the gaze directions detected by example gaze detector 214.

The example location detector 216 of FIG. 2 utilizes image capturing equipment, audio capture equipment and/or proximity detection equipment to determine a location of the person 104 relative to the media presentation device 108. For example, the location detector 216 of FIG. 2 determines a first distance between the person 104 and a center of the media presentation device 108 in a first direction (e.g., an X-coordinate) and a second distance between the person 104 and the center of the media presentation device 108 in a second direction (e.g., a Y-coordinate). Using the determined distance(s), the example location detector 216 determines whether the person 104 is located within a consumption range of the media presentation device 108, the consumption range being representative of an area in which a person is capable of consuming the media presented on the media presentation device 108. The consumption range may depend on (e.g., be defined based on) one or more aspects of the media presentation device 108 such as, for example, screen size, volume capabilities, etc. In some examples, the attention identifier 212 uses the information generated by the example location detector 216 to calculate the likelihood that the person 104 is paying attention to the media presentation device 108. For example, the attention identifier 212 of FIG. 2 determines that the person 104 is not paying attention to the media presentation device 108 if the person 104 is located outside the consumption range. On the other hand, the likelihood calculated by the example attention identifier 212 of FIG. 2 is greater when the person 104 is located in the consumption range. Additionally or alternatively, the example attention identifier 212 factors a magnitude of the first and/or second distances (e.g., X-coordinate and/or Y-coordinate) into a value of the likelihood. For example, greater distances away from the media presentation device 108 are translated by the attention identifier 212 into lesser likelihoods, while shorter distances away from the media presentation device 108 are translated into greater likelihoods. In the example of FIG. 2, the value of the likelihood of attention is proportional to the value of the distance(s) generated by the example location detector 216.

The example orientation detector 218 utilizes, for example, image capturing equipment to determine an orientation (e.g., angle) of the person 104 relative to the media presentation device 108. For example, the orientation detector 218 determines whether the person 104 is facing the media presentation device 108, turned away from the media presentation device 108, or at some intermediate angle. The example orientation detector 218 of FIG. 2 detects the orientation of a head of the person 104, the body of the person 104 and/or a combination of the head and the body of the person 104. In some examples, the attention identifier 212 calculates the likelihood that the person 104 is paying attention to the media presentation device 108 based on the information generated by the orientation detector 218. For example, the attention identifier 212 of FIG. 2 generates greater likelihoods of attention when the person 104 is facing the media presentation device 108 than when the person 104 turned away from the media presentation device 108. In the example of FIG. 2, the value of the likelihood of attention is proportional to the value of the orientation angle generated by the example orientation detector 218.

The example attention identifier 212 of FIG. 2 utilizes one or more of the detectors 214-218 and/or any other suitable source of attention indicative information to calculate the likelihood of attention of the person 104. Based on the calculated likelihood, the example attention identifier 212 of FIG. 2 conveys instructions to a transmission controller 220 to control the delivery of power to the computing device 106 from the wired power source 118, the light-based wireless power source 114 or the resonance-based power source 116. In the illustrated example of FIG. 2, if the calculated likelihood is above a threshold, the example attention identifier 212 instructs the transmission controller 220 to enable delivery of power to the computing device 106 via whichever one of the power sources 114-118 is in communication with the computing device 106. If the calculated likelihood is below the threshold, the example attention identifier 212 instructs the transmission controller 220 to restrict delivery of power of computing device 106. In some examples, the attention identifier 212 additionally conveys an indication of the power delivery restriction to the instruction presenter 204, which causes the media presentation device 108 to display a notice to the person 104 that charging of the computing device 106 has ceased (e.g., at least temporarily). In some examples, the notice presented on the media presentation device 108 instructs the person 104 that charging of the computing device 106 will resume if the person 104 pays attention to the media presentation device 108.

The example device charger 112 of FIG. 2 includes a data manager 222 to facilitate transmission of information from the data source 200 to, for example, the computing device 106. In the illustrated example of FIG. 2, the data manager 222 causes the transmission controller 220 to implement transmission data of the data source 200 to the computing device 106 via the same medium by which power is being transmitted to the computing device 106. For example, when the computing device 106 is receiving power from the light-based wireless power source 116, the example data manager 222 and the transmission controller 220 facilitate transmission of data from the data source 200 to the computing device 106 over the beam of light generated by the light-based wireless power source 114. Thus, while the computing device 106 is receiving power from the light-based wireless power source 114, the computing device 106 also receives data from the data source 200. Additionally or alternatively, the example data manager 222 and/or the example transmission controller 220 of FIG. 2 utilizes different mediums for delivery of the power and the data to the computing device 108. Example data from the data source 200 includes advertisements that are formatted for presentation on the computing device 106. In some examples, the data manager 222 selects advertisements of the data source 200 that correspond to the current advertisement being presented via the media presentation device 108 for conveyance to the computing device 106.

In some examples, the data manager 222 requests and/or obtains information from the computing device 104 over the communication medium being used to, for example, delivery power. For example, the data manager 222 may obtain identification and/or profile information associated with the computing device 106 and/or the person 104.

While an example manner of implementing the charging station 102 of FIG. 1 is illustrated in FIG. 2, one or more of the elements, processes and/or devices illustrated in FIG. 2 may be combined, divided, re-arranged, omitted, eliminated and/or implemented in any other way. Further, the example advertisement presenter 202, the example instruction presenter 204, the example session initiator 206, the example manual detector 208, the example automatic detector 210, the example attention identifier 212, the example gaze detector 214, the example location detector 216, the example orientation detector 218, the example transmission controller 220, the example data manager 222 and/or, more generally, the example charging station 102 of FIG. 2 may be implemented by hardware, software, firmware and/or any combination of hardware, software and/or firmware. Thus, for example, any of the example advertisement presenter 202, the example instruction presenter 204, the example session initiator 206, the example manual detector 208, the example automatic detector 210, the example attention identifier 212, the example gaze detector 214, the example location detector 216, the example orientation detector 218, the example transmission controller 220, the example data manager 222 and/or, more generally, the example charging station 102 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example advertisement presenter 202, the example instruction presenter 204, the example session initiator 206, the example manual detector 208, the example automatic detector 210, the example attention identifier 212, the example gaze detector 214, the example location detector 216, the example orientation detector 218, the example transmission controller 220, the example data manager 222 and/or, more generally, the example charging station 102 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example charging station 102 of FIG. 1 may include one or more elements, processes and/or devices in addition to, or instead of, those illustrated in FIG. 2, and/or may include more than one of any or all of the illustrated elements, processes and devices.

Figure 3:
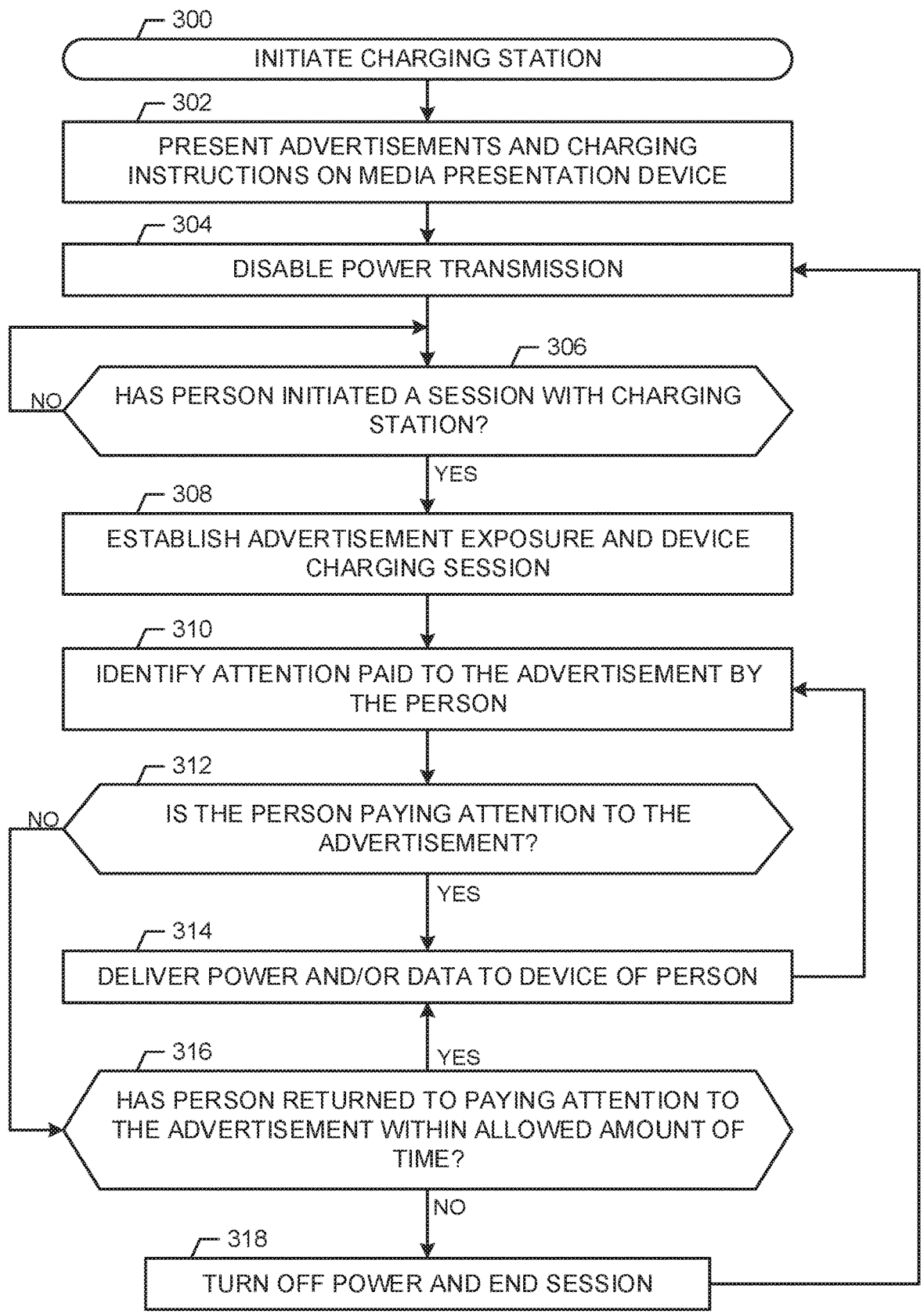
FIG. 3 is a flowchart representative of example machine readable instructions that may be executed to implement the example charging station of FIGS. 1 and/or 2.

A flowchart representative of example machine readable instructions for implementing the example charging station 102 of FIGS. 1 and/or 2 is shown in FIG. 3. In some examples, the machine readable instructions are implemented by a logic circuit such as an application specific integrated circuit (ASIC). In some examples, the instructions are stored in a tangible computer readable storage medium such as flash memory or Electronically Erasable Programmable Read-Only Memory (EEPROM). In some such examples, the machine readable instructions comprise a program for execution by a processor such as the processor 412 shown in the example processor platform 400 discussed below in connection with FIG. 4. The program may be embodied in software stored on a tangible computer readable storage medium such as a memory associated with the processor 412, but the entire program and/or parts thereof could alternatively be executed by a device other than the processor 412 and/or embodied in firmware or dedicated hardware. Further, although the example instructions are described with reference to the flowchart illustrated in FIG. 3, many other methods of implementing the example charging station 102 of FIGS. 1 and/or 2 may alternatively be used. For example, the order of execution of the blocks may be changed, and/or some of the blocks described may be changed, eliminated, or combined.

As mentioned above, the example processes of FIG. 3 may be implemented using coded instructions (e.g., computer and/or machine readable instructions) stored on a tangible computer readable storage medium such as a flash memory, a read-only memory (ROM), a cache, and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIG. 3 may be implemented using coded instructions (e.g., computer and/or machine readable instructions) stored on a non-transitory computer and/or machine readable medium such as a flash memory, a read-only memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

FIG. 3 begins with an initiation of the example charging station 102 (block 300). For example, the charging station 102 is activated when implemented in a public place such as an airport or shopping mall. In the example of FIG. 3, the media presentation device 108 is to display one or more advertisements according to, for example, a schedule managed by the example advertisement presenter 202 of the device charger 112 (block 302). Further, the example instruction presenter 204 of the device charger 112 presents instructions regarding the capability of the charging station 102 to provide power to a battery of a computing device in exchange for attention being paid to the media presentation device 108 (block 302). At this stage, the example transmission controller 220 disables transmission of power, as no sessions have been established (block 304). The example session initiator 206 of the device charger 112 monitors the environment 100 to determine whether the person 104 (or any other person) has engaged the charging station 102 (e.g., manually by selected a user interface button such as 'Start' or automatically placing the computing device 106 in a position according to the charging instructions) (block 306). If the person 104 engages the charging station 102 (block 306), the example session initiator 206 establishes an advertisement exposure and device charging session with the person 104 and/or the computing device 106 (block 308). In the example of FIG. 3, the session initiator 206 identifies which of the light-based wireless power source 114, the resonance-based wireless power source 116 and the wired power source 118 is being used by the person 104 to charge the computing device 106.

When the session initiator 206 has established a device charging session, the example attention identifier 212 of the device charger 112 determines whether the person 104 is likely paying attention to the media presentation device 108 (block 310). In the illustrated example, the attention identifier 212 utilizes one or more of the gaze detector 214, the location detector 216 and the orientation detector 218 to calculate the likelihood of attention. If the attention identifier 212 determines that the person 104 is likely paying attention to the media presentation device 108 (e.g., the likelihood is greater than a threshold percentage) (block 312), the example transmission controller 220 enables the corresponding one of the power sources 114-118 to deliver power to the computing device 106 (block 314). Additionally, the example data manager 222 of the device charger 112 indicates whether data (e.g., an advertisement or other promotional material) is to be conveyed to the computing device 106 (e.g., via the medium being used to charge the computing device 106) (block 314).

As power is being delivered to the computing device 106, the example attention identifier 212 continues to determine whether the person 104 is likely paying attention to the media presentation device 108 (block 310). If the attention identifier 212 determines that the person 104 is not likely paying attention to the media presentation device 108 (block 312), the example attention identifier 212 again determines whether the person 104 is likely paying attention to the media presentation device 108 after an amount of time (block 316). Thus, in the example of FIG. 3, the attention identifier 212 allows the person 104 to not pay attention for an allowed amount of time without ceasing delivery of power to the computing device 106. However, if the person 104 does not return to paying attention to the media presentation device 108 within the allowed amount of time (block 316), the example session initiator 206 ends the session (block 318) and the transmission controller 220 ceases the delivery of power to the computing device 106 (block 304).

Figure 4:
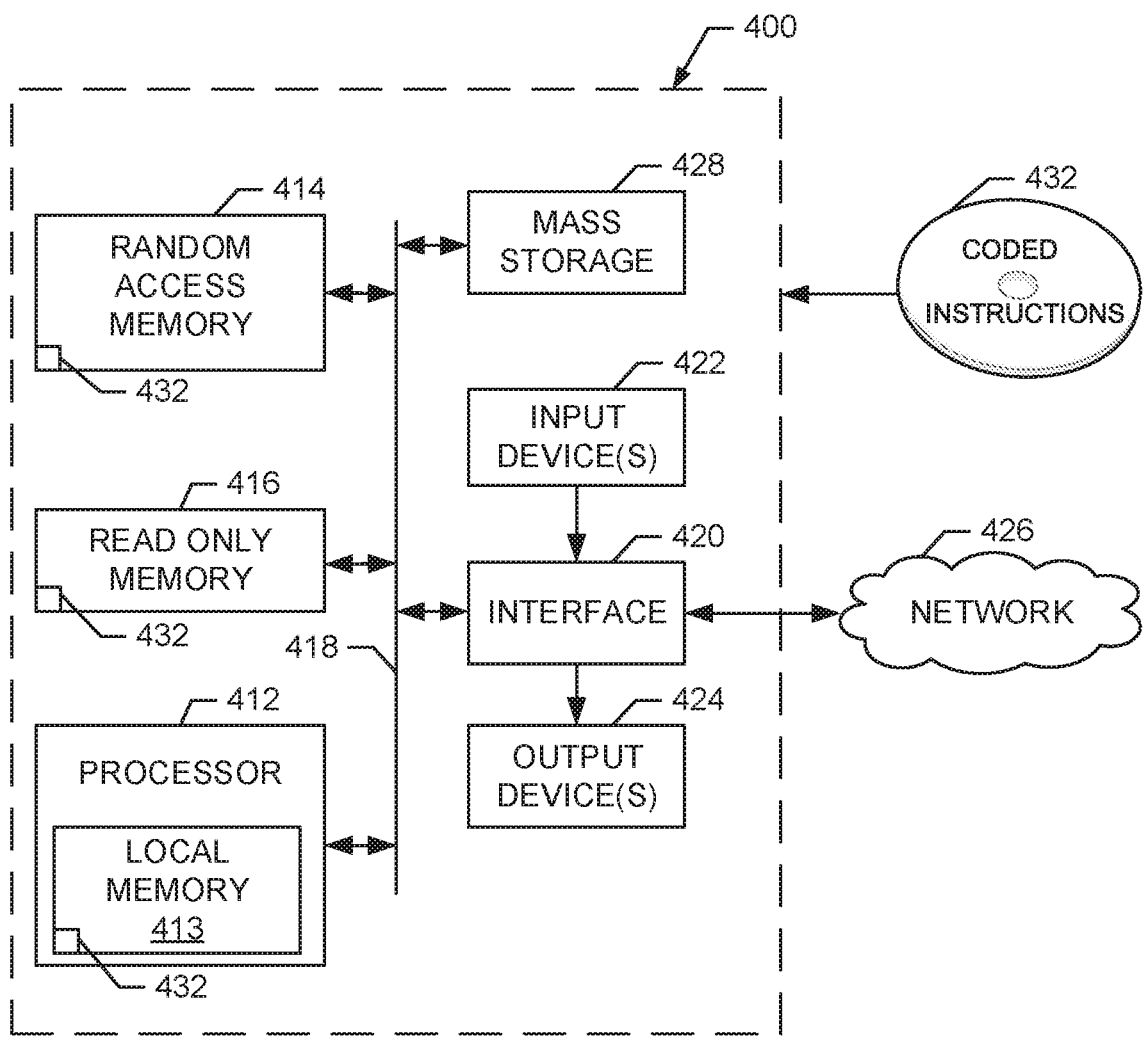
FIG. 4 is a block diagram of an example processing system capable of executing the example machine readable instructions of FIG. 3 to implement the example charging station of FIGS. 1 and/or 2.

FIG. 4 is a block diagram of an example processor platform 400 capable of executing the instructions of FIG. 3 to implement the example charging station 102 of FIGS. 1 and/or 2. The processor platform 400 can be any suitable computing device such as, for example, a server, a computer, a system on chip (SoC) and/or ASIC.

The processor platform 400 of the illustrated example includes a processor 412. The processor 412 of the illustrated example is hardware. For example, the processor 412 can be implemented by one or more integrated circuits, logic circuits, microprocessors or controllers from any desired family or manufacturer.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit(s) a user to enter data and commands into the processor 412. The input device(s) can be implemented by, for example, an audio sensor, a microphone, and/or a button.

One or more output devices 424 are also connected to the interface circuit 420 of the illustrated example. The output devices 424 can be implemented, for example, a light emitting diode (LED).

The interface circuit 420 of the illustrated example also includes a communication device such as a transmitter, a receiver, a transceiver, and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

Coded instructions 432 corresponding to the machine readable instructions of FIG. 3 may be stored in the volatile memory 414 and/or in the non-volatile memory 416 and/or a removable storage medium.

A first disclosed example apparatus includes a detector to identify an indication of attention being paid to a display by a person, and a controller to enable delivery of power to a device associated with the person in response to the indication of attention being paid to the display.

In a second disclosed example apparatus and/or the first disclosed example apparatus, the controller is to disable the delivery of power to the device when the indication of attention is no longer detected.

In a third disclosed example apparatus, the second disclosed example apparatus, and/or the first disclosed example apparatus, enabling the delivery of power to the device comprises enabling a transmitter to wirelessly transmit power to the device.

In a fourth disclosed example apparatus, the third disclosed example apparatus, the second disclosed example apparatus, and/or the first disclosed example apparatus, the apparatus further includes a transmitter to transmit the power to the device and to transmit an advertisement to the device via a same transmission medium as the power.

In a fifth disclosed example apparatus, the fourth disclosed example apparatus, the third disclosed example apparatus, the second disclosed example apparatus, and/or the first disclosed example apparatus, the transmission medium by which the power and the advertisement are delivered comprises a beam of light.

In a sixth disclosed example apparatus, the fifth disclosed example apparatus, the fourth disclosed example apparatus, the third disclosed example apparatus, the second disclosed example apparatus, and/or the first disclosed example apparatus, the detector is to identify the indication of attention by determining a direction in which the person is looking.

In a seventh disclosed example apparatus, the sixth disclosed example apparatus, the fifth disclosed example apparatus, the fourth disclosed example apparatus, the third disclosed example apparatus, the second disclosed example apparatus, and/or the first disclosed example apparatus, the detector is to identify the indication of attention by determining a location of the person relative to the display.

A first disclosed example method includes determining an indication of visual media consumption of a display by a person, and enabling delivery of power to a device associated with the person in response to determining that the visual media consumption is associated with the person.

In a second disclosed example method and/or the first disclosed example method, the method further includes disabling the delivery of power to the device in response to termination of the visual media consumption.

In a third disclosed example method, the second disclosed example method, and/or the first disclosed example method, enabling the delivery of power to the device comprises enabling a transmitter to wirelessly transmit power to the device.

In a fourth disclosed example method, the third disclosed example method, the second disclosed example method, and/or the first disclosed example method, the method further includes delivering an advertisement to the device via a same transmission medium as the delivery of power.

In a fifth disclosed example method, the fourth disclosed example method, the third disclosed example method, the second disclosed example method, and/or the first disclosed example method, the transmission medium by which the power and the advertisement are delivered comprises a beam of light.

In a sixth disclosed example method, the fifth disclosed example method, the fourth disclosed example method, the third disclosed example method, the second disclosed example method, and/or the first disclosed example method, determining the indication of the visual consumption of the display comprises determining a direction in which the person is looking.

In a seventh disclosed example method, the sixth disclosed example method, the fifth disclosed example method, the fourth disclosed example method, the third disclosed example method, the second disclosed example method, and/or the first disclosed example method, determining the indication of the visual consumption of the display comprises determining a location of the person relative to the display.

A first disclosed example tangible computer readable storage medium has instructions stored thereon that, when executed, cause a machine to at least determine an indication of visual media consumption of a display by a person, and enable delivery of power to a device associated with the person in response to determining that the visual media consumption is associated with the person.

In a second disclosed example storage medium and/or the first disclosed example storage medium, the instructions cause the machine to disable the delivery of power to the device in response to determining that the person is likely not consuming media of the display.

In a third disclosed example storage medium, the second disclosed example storage medium and/or the first disclosed example storage medium, enabling the delivery of power to the device comprises enabling a transmitter to wirelessly transmit power to the device.

In a fourth disclosed example storage medium, the third disclosed example storage medium, the second disclosed example storage medium and/or the first disclosed example storage medium, the instructions cause the machine to deliver an advertisement to the device via a same transmission medium as the delivery of power.

In a fifth disclosed example storage medium, the fourth disclosed example storage medium, the third disclosed example storage medium, the second disclosed example storage medium and/or the first disclosed example storage medium, the transmission medium by which the power and the advertisement are delivered comprises a beam of light.

In a sixth disclosed example storage medium, the fifth disclosed example storage medium, the fourth disclosed example storage medium, the third disclosed example storage medium, the second disclosed example storage medium and/or the first disclosed example storage medium, determining the indication of the visual consumption of the display comprises determining a direction in which the person is looking.

In a seventh disclosed example storage medium, the sixth disclosed example storage medium, the fifth disclosed example storage medium, the fourth disclosed example storage medium, the third disclosed example storage medium, the second disclosed example storage medium and/or the first disclosed example storage medium, determining the indication of the visual consumption of the display comprises determining a location of the person relative to the display.

A first example system includes means for determining an indication of visual media consumption of a display by a person; and means for enabling delivery of power to a device associated with the person in response to determining that the visual media consumption is associated with the person.

In a second disclosed example system and/or the first disclosed example system, the system further comprises means for disabling the delivery of power to the device in response to determining that the person is likely not consuming media of the display.

In a third disclosed example system, the second disclosed example system and/or the first disclosed example system, enabling the delivery of power to the device comprises enabling a transmitter to wirelessly transmit power to the device.

In a fourth disclosed example system, the third disclosed example system, the second disclosed example system and/or the first disclosed example system, the system further comprises means for delivering an advertisement to the device via a same transmission medium as the delivery of power.

In a fourth disclosed example system, the third disclosed example system, the second disclosed example system and/ or the first disclosed example system as defined in claim 25, the transmission medium by which the power and the advertisement are delivered comprises a beam of light.

In a fifth disclosed example system, the fourth disclosed example system, the third disclosed example system, the second disclosed example system and/or the first disclosed example system, determining the indication of the visual consumption of the display comprises determining a direction in which the person is looking.

In a sixth disclosed example system, the fifth disclosed example system, the fourth disclosed example system, the third disclosed example system, the second disclosed example system and/or the first disclosed example system, determining the indication of the visual consumption of the display comprises determining a location of the person relative to the display.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A charging station, comprising:
   a session initiator to establish a charging session with a computing device;
   an advertisement presenter to present an advertisement on a display to a person during the charging session;
   a timer to determine a duration of time for the advertisement;
   a device charger to:
      enable delivery of power to the computing device during the duration of time for the advertisement; and
      disable delivery of power to the computing device after the duration of time for the advertisement; and
   a detector to:
      determine an amount of time when the person is not paying attention to the display; and
      compare the amount of time to a threshold amount of time,
   the device charger to continue delivery of power to the computing device when the amount of time is less than the threshold amount of time, and
   the device charger to disable delivery of power to the computing device when the amount of time exceeds the threshold amount of time.

2. The charging station of claim 1, wherein the advertisement is a first advertisement having a first duration, the timer is to determine a second duration of time for a second advertisement, the second duration greater than the first duration, and the device charger is to manage delivery of more power to the computing device when the advertisement presenter presents the second advertisement than when the advertisement presenter presents the first advertisement based on the second duration being greater than the first duration.

3. The charging station of claim 1, wherein the advertisement presenter is to obtain recurrent updates of data from a data source including the advertisement via a network connection.

4. The charging station of claim 3, wherein the advertisement presenter is to maintain a schedule of advertisements based on the data from the data source.

5. The charging station of claim 4, wherein the schedule indicates an amount of time to display an advertisement.

6. The charging station of claim 1, wherein the amount of time is a first amount of time, and the timer is to modify the duration of time based on a second amount of time the person paid attention to the display.

7. The charging station of claim 6, wherein the timer is to modify the duration of time by decreasing the duration when the person is not paying attention.

8. The charging station of claim 1, wherein the detector is to:
   determine a gaze direction in which the person is looking;
   calculate an angular value of the gaze direction relative to a center of the display;
   determine the person is paying attention to the display based on the angular value.

9. The charging station of claim 1, wherein the detector is to determine the person is paying attention to the display based on a location of the person with respect to the display.

10. The charging station of claim 9, wherein the detector is to determine the location of the person with respect to the display by:
    detecting a first distance between the person and a center of the charging station in a x-coordinate direction;
    detecting a second distance between the person and the center of the charging station in a y-coordinate direction; and
    determining if the person is within a threshold range of the advertisement presenter based on the first distance and the second distance.

11. The charging station of claim 9, wherein the threshold range is based on a volume capability of the advertisement presenter.

12. The charging station of claim 1, wherein the detector is to:
    determine an orientation of at least one of a head or a body of the person;
    calculate an angular value of the orientation to the display;
    determine the person is paying attention to the display based on the angular value.

13. At least one non-transitory computer readable storage medium comprising instructions that, when executed, cause a processor of a charging station to at least:
    establish a charging session with a computing device;
    present an advertisement on a display to a person during the charging session;
    determine a first amount of time for display of an advertisement;
    determine a second amount of time that the person paid attention to the display;
    determine a third amount of time that the person did not pay attention to the display;
    compare the third amount of time to a threshold amount of time;
    manage delivery of power to the computing device based on the first amount of time when the third amount of time is less than the threshold amount of time; and
    manage delivery of power to the computing device based on the second amount of time when the third amount of time exceeds the threshold amount of time.

14. The storage medium of claim 13, wherein the advertisement is a first advertisement, and the instructions further cause the processor to:

determine a fourth amount of time for display of a second advertisement, the fourth amount of time greater than the first amount of time; and manage the delivery of the power to the computing device to include more power in response to display of the second advertisement than in response to display of the first advertisement based on the second amount of time being greater than the first amount of time.

15. The storage medium of claim 13, wherein the instructions cause the processor to access recurrent updates of data including the advertisement via a communication network.

16. The storage medium of claim 13, wherein the instructions further cause the processor to:

determine when the person paid attention to the display based on a location of the person with respect to the display; and determine the location of the person with respect to the display by:

detecting a first distance between the person and a center of the charging station in a x-coordinate direction;

detecting a second distance between the person and the center of the charging station in a y-coordinate direction; and determining if the person is in a threshold range of the charging station based on the first distance and the second distance.

17. The storage medium of claim 16, wherein the threshold range is based on at least one of a screen size or a volume capability of the charging station.

18. A charging station comprising:

means for establishing a charging session with a computing device;

means for presenting an advertisement to a person during the charging session;

means for determining a duration of time for the advertisement;

means for managing delivery of power to the computing device based on the duration of time for the advertisement by enabling delivery of power during the duration of time for the advertisement and restricting delivery of power outside of the duration of time for the advertisement; and means for detecting when the person is paying attention to the display, the detecting means to:

determine an amount of time when the person is not paying attention to the display; and compare the amount of time to a threshold amount of time, the means for managing delivery to continue delivery of power to the computing device when the amount of time is less than the threshold amount of time, and the means for managing delivery to disable delivery of power to the computing device when the amount of time exceeds the threshold amount of time.

19. The charging station of claim 18, wherein the advertisement is a first advertisement having a first duration, the means for determining is to determine a second duration of time for a second advertisement, the second duration greater than the first duration, and the means for managing is to manage delivery of more power to the computing device when the means for presenting presents the second advertisement than when the means for presenting presents the first advertisement based on the second duration being greater than the first duration.

20. The charging station of claim 18, wherein the means for determining is to modify the duration of time based on an amount of time the person paid attention to the display by decreasing the duration when the person is not paying attention.

21. The charging station of claim 18, wherein the detecting means is to determine the person is paying attention to the display based on a location of the person with respect to the display and the detecting means is to determine the location of the person with respect to the display by:

detecting a first distance between the person and a center of the charging station in a x-coordinate direction;

detecting a second distance between the person and the center of the charging station in a y-coordinate direction; and determining if the person is within a threshold range of the advertisement presenter based on the first distance and the second distance.

22. The charging station of claim 21, wherein the threshold range is based on at least one of a screen size or a volume capability of the means for presenting.

23. A method comprising:

establishing a charging session between a charging station and a computing device;

presenting an advertisement on a display to a person during the charging session;

determining a first amount of time for display of the advertisement;

determining a second amount of time that the person paid attention to the display;

determining a third amount of time that the person did not pay attention to the display;

comparing the third amount of time to a threshold amount of time;

managing, by executing instructions with a processor, delivery of power to the computing device for the first amount of time when the third amount of time is less than the threshold amount of time; and managing, by executing instructions with the processor, delivery of power to the computing device for the second amount of time when the third amount of time exceeds the threshold amount of time.

24. An apparatus comprising:

at least one memory;

instructions stored in the at least one memory; and at least one processor to execute the instructions to:

establish a charging session with a computing device;

present an advertisement on a display to a person during the charging session;

determine a first amount of time for display of an advertisement;

determine a second amount of time that the person paid attention to the display;

determine a third amount of time that the person did not pay attention to the display;

compare the third amount of time to a threshold amount of time;

manage delivery of power to the computing device based on the first amount of time when the third amount of time is less than the threshold amount of time; and manage delivery of power to the computing device based on the second amount of time when the third amount of time exceeds the threshold amount of time.

* * * * *